US010836118B2

(12) United States Patent
Meegan et al.

(10) Patent No.: US 10,836,118 B2
(45) Date of Patent: *Nov. 17, 2020

(54) MODIFIED RESIN SYSTEMS FOR LIQUID RESIN INFUSION APPLICATIONS AND PROCESS METHODS RELATED THERETO

(71) Applicant: Cytec Technology Corp., Wilmington, DE (US)

(72) Inventors: Jonathan Edward Meegan, Chester (GB); Robert Blackburn, Hull (GB)

(73) Assignee: Cytec Industries Inc., Princeton, NJ (US)

( * ) Notice: Subject to any disclaimer, the term of this patent is extended or adjusted under 35 U.S.C. 154(b) by 298 days.

This patent is subject to a terminal disclaimer.

(21) Appl. No.: 15/653,098

(22) Filed: Jul. 18, 2017

(65) Prior Publication Data

US 2017/0326819 A1 Nov. 16, 2017

Related U.S. Application Data

(62) Division of application No. 12/963,823, filed on Dec. 9, 2010, now abandoned.

(30) Foreign Application Priority Data

Dec. 23, 2009 (GB) .................................. 0922599.6

(51) Int. Cl.
*B29C 70/02* (2006.01)
*B29C 70/48* (2006.01)
(Continued)

(52) U.S. Cl.
CPC .......... *B29C 70/025* (2013.01); *B29C 70/443* (2013.01); *B29C 70/48* (2013.01);
(Continued)

(58) Field of Classification Search
CPC ........................... B29C 70/025; B29C 70/443
See application file for complete search history.

(56) References Cited

U.S. PATENT DOCUMENTS

| 8,084,120 | B2 | 12/2011 | Hill et al. | |
|---|---|---|---|---|
| 8,518,208 | B2 * | 8/2013 | Kohli | C09J 163/00 156/330 |
| 2004/0034187 | A1 * | 2/2004 | Arai | C08L 63/00 528/87 |

FOREIGN PATENT DOCUMENTS

EP 0441047 A1 * 8/1991
GB 2460050 A * 11/2009

OTHER PUBLICATIONS

Kaneka Core-Shell Toughening Systems for Thermosetting Resins, 53 pages. https://www.trfa.org/erc/docretrieval/uploadedfiles/Technical%20Papers/2007%20Meeting/Sober-Kaneka_ppt-Toughening%20of%20Resins.pdf (Year: 2007).*

(Continued)

*Primary Examiner* — Xiao S Zhao
*Assistant Examiner* — Emmanuel S Luk
(74) *Attorney, Agent, or Firm* — Thi Dang

(57) ABSTRACT

A manufacturing process, which includes: (i) preparing a preform; (ii) laying the preform within a mold; (iii) heating the mold to a predetermined temperature; and (iv) injecting a modified resin system, wherein the modified resin system is formulated to have a viscosity below a threshold viscosity at a specific temperature and a high level of toughness. In one embodiment, the modified resin system contains a combination of epoxies, a curing agent, core-shell rubber particles, a thermoplastic material in an amount of less than 7% by weight, wherein in a cured condition, the thermoplastic material is separated into aggregate domains from the base resin, each aggregate domain having an island-like morphology.

10 Claims, 10 Drawing Sheets

(51) Int. Cl.
    *C08L 63/00*           (2006.01)
    *B29C 70/44*           (2006.01)
    *B29K 63/00*           (2006.01)
    *B29K 105/16*          (2006.01)

(52) U.S. Cl.
    CPC .......... *C08L 63/00* (2013.01); *B29K 2063/00* (2013.01); *B29K 2105/165* (2013.01); *C08L 2205/02* (2013.01); *Y10T 428/249921* (2015.04)

(56) References Cited

OTHER PUBLICATIONS

Su et al, Chemical Interactions in Blends of Bisphenol A Polycarbonate with Tetraglycidyl-4,4'-diaminodiphnyelrnethane Epoxy, Macromolecules, 1995, 28, 6779-6786, 8 pages. (Year: 1995).*

* cited by examiner

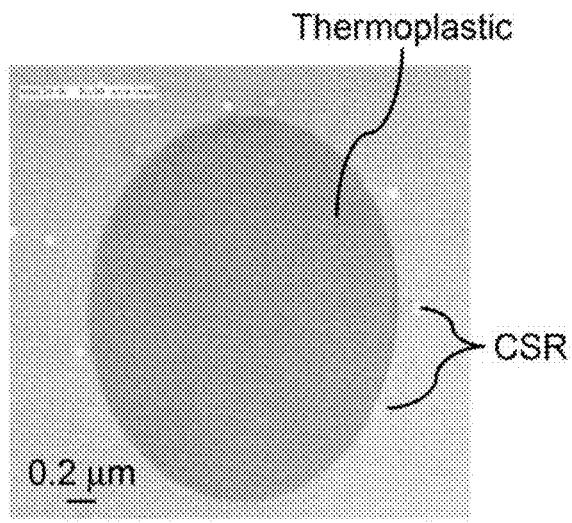
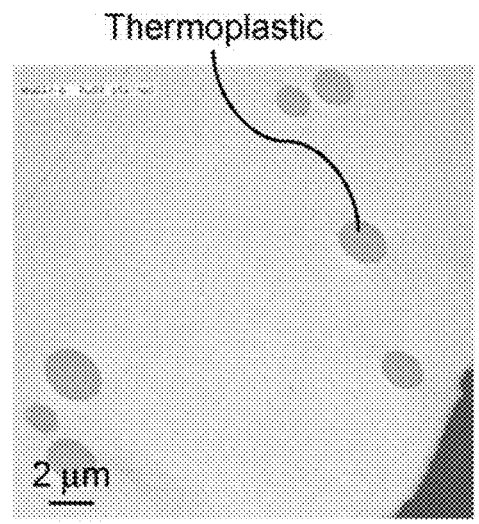
FIG.7A  FIG.7B
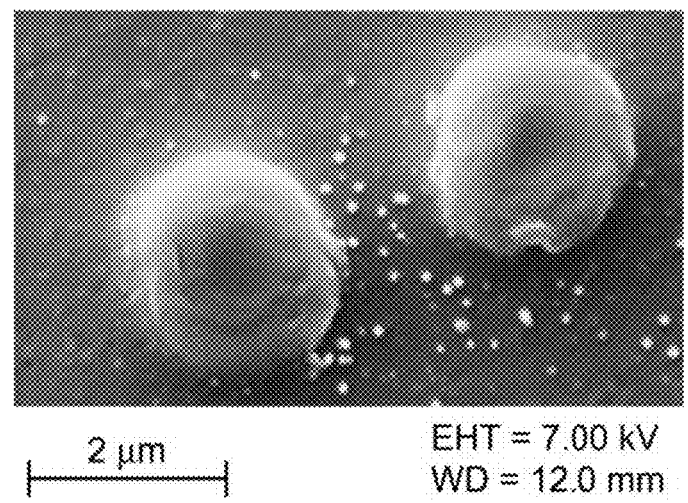
FIG.8

MODIFIED RESIN SYSTEMS FOR LIQUID RESIN INFUSION APPLICATIONS AND PROCESS METHODS RELATED THERETO

The current application is a divisional application of U.S. application Ser. No. 12/963,823 filed on Dec. 9, 2010, which claims the benefit of prior United Kingdom Application No. 0922599.6 filed on Dec. 23, 2009, both of which are incorporated herein in their entirety.

FIELD OF INVENTION

Modified resin systems for liquid resin infusion applications, prepreg autoclave applications and hybrids thereof.

BACKGROUND OF INVENTION

Liquid resin infusion (LRI) is a process used to manufacture fiber-reinforced composite structures and components for use in a range of different industries including the aerospace, transport, electronics, and building and leisure industries. The general concept in LRI technology involves infusing resins into a fiber reinforcement, fabric or a pre-shaped fibrous reinforcement ("preform") by placing the material or preform into a mold (two-component mold or single-sided mold) and then injecting resin under high pressure (or ambient pressure) into the mold cavity or vacuum bag sealed single-sided mold. The resin infuses into the material or preform resulting in a fiber-reinforced composite structure. LRI technology is especially useful in manufacturing complex-shaped structures which are otherwise difficult to manufacture using conventional technologies. Variation of liquid resin infusion processes include, but are not limited to, Resin Infusion with Flexible Tooling (RIFT), Constant Pressure Infusion (CPI), Bulk Resin Infusion (BRI), Controlled Atmospheric Pressure Resin Infusion (CAPRI), Resin Transfer Molding (RTM), Seemann Composites Resin Infusion Molding Process (SCRIMP), Vacuum-assisted Resin Infusion (VARI) and Vacuum-assisted Resin Transfer Molding (VARTM).

Most resin infusion systems are inherently brittle, and the viscosity levels necessary to achieve the injection process preclude the use of toughening agents. Said differently, the properties of toughness and low viscosity are typically mutually exclusive in conventional resin infusion systems. In prepregs, high levels of toughness are generally achieved through the addition of about ten percent (10%) to about thirty percent (30%) by weight of a thermoplastic toughener to the base resin. However, addition of such tougheners to LRI systems generally results in an unacceptable increase in the viscosity of the resin and/or reduction in resistance of the cured material to solvents. In the specific case of particulate toughener, there may be additional filtering issues in the textile. These limitations render the addition of tougheners conventionally added in prepregs generally unsuitable in conventional LRI applications.

One technology to toughen fiber-reinforced composite structures manufactured by LRI technologies is to integrate the toughener into the preform itself. For example, a soluble toughening fiber may be directly woven into the preform thereby eliminating the need to add toughener into the resin which otherwise would increase the viscosity of the resin (rendering it unsuitable for resin infusion). Another example is the use of soluble or insoluble veils comprising of toughener used as an interleaf with the reinforcement of the preform. However, in either of these methods, the manufacturing process may be more complicated and costly, in addition to increasing the risk of hot/wet performance knock-downs and solvent sensitivity with a polymer based insoluble interleaf. Another technology is the addition of particles to the resin. The amount of particles required to reach a suitable toughness threshold, however, is often high resulting in a viscous resin requiring a very narrow process window that is generally unfavorable for LRI.

SUMMARY OF INVENTION

A formulation, comprising: (i) at least one base resin; (ii) an amount of particles within a predetermined range in a carrier resin; and (iii) an amount of thermoplastic material within a predetermined range wherein the base resin, the particles and the thermoplastic material are combined to form a modified resin system, the modified resin having an average viscosity below a threshold average viscosity within a predetermined temperature range is herein disclosed. The formulation may further comprise a curing agent. The curing agent may be an aniline-based amine compound. The base resin may be one of epoxy, bismaleimide, cyanate ester or a combination thereof. The base resin may be a combination of epoxies including at least one di-, tri- or tetra-epoxy. The particles may be one of chemically functionalized or chemically nonfunctionalized core-shell rubber particles or hollow particles. A material comprising the core may be one of polybutadiene-styrene, polybutadiene or a combination thereof, and a material comprising the shell may be one of silica, polymerized monomers of acrylic acid derivatives containing the acryl group including acrylic and poly(methyl methacrylate) or a combination thereof. In a cured condition, the particles may be substantially uniformly dispersed throughout the modified resin system. The thermoplastic material may be one of phenoxy-based polymers, poly(ether sulfone) polymers, poly(ether ether sulfones), poly(methyl methacrylate) polymers, carboxylterminated butadiene acrylonitrile polymers, copolymers thereof, or combinations thereof. The formulation wherein the amount of thermoplastic material is below approximately 30% net weight, preferably below 7%, of the modified resin system. In a cured condition, at least the thermoplastic material phase may separate from the base resin. More particularly, the thermoplastic material phase may separate into aggregate domains from the base resin, each aggregate domain having an island-like morphology. The morphology in a cured article may evolve: (i) during the later stages of a ramp to dwell temperature; or (ii) after a ramp to dwell has been completed during the cure cycle. The amount of particles and the amount of thermoplastic material may be combined in a 1 to 0.56 ratio. The threshold average viscosity may be less than 5 Poise at a temperature of less than 180° C., more narrowly between 80° C. and 130° C.

A composite article, comprising: a structure having a predetermined shape, the structure having a plurality of layers of a fiber-based fabric, the structure having a targeted composite toughness within a predetermined range, wherein the toughness is at least partially imparted by a modified resin system during a process, the modified resin system including: (i) at least one base resin; (ii) an amount of particles within a predetermined range in a carrier resin; and (iii) an amount of thermoplastic material within a predetermined range wherein the base resin, the particles and the thermoplastic material are combined to form the modified resin system, the modified resin having a average viscosity below a threshold average viscosity within a predetermined temperature range is herein disclosed.

The modified resin system may further include a curing agent, the curing agent comprising an aniline-based amine compound. The base resin may be one of epoxy, bismaleimide, cyanate ester or a combination thereof. The base resin may include a combination of epoxies including at least one di-, tri- or tetra-epoxy. The particles may be one of core-shell rubber (CSR) particles or hollow particles wherein, when the particles are CSR particles, a material comprising the core is one of polybutadiene-styrene, polybutadiene or a combination thereof, and a material comprising the shell is one of silica, polymerized monomers of acrylic acid derivatives containing the acryl group including acrylic and poly (methyl methacrylate) or a combination thereof. In a cured condition, the particles may be substantially uniformly dispersed throughout the modified resin system. The thermoplastic material may be one of phenoxy-based polymers, poly(ether sulfone) polymers, poly(ether ether sulfones), polymerized monomers of acrylic acid derivatives containing the acryl group including acrylic and poly(methyl methacrylate) polymers, carboxylterminated butadiene acrylonitrile polymers, copolymers thereof, or combinations thereof. The amount of thermoplastic material is below approximately 30% net weight, preferably below 7% net weight, of the modified resin system. With the base resin in a partially cured or gel-like state, the thermoplastic material may separate into aggregate domains from the base resin, each aggregate domain having an island-like morphology. The amount of particles and the amount of thermoplastic material may be combined in a 1 to 0.56 ratio. The structure may exhibit a high level of microcrack resistance. The threshold average viscosity may be less than 5 Poise at a temperature of less than 180° C., more narrowly between 80° C. to 130° C. The fiber-based fabric may be comprised of reinforcing fibers of a material selected from the group consisting of organic polymer, inorganic polymer, carbon, glass, inorganic oxide, carbide, ceramic, metal or a combination thereof. The process may be a liquid resin infusion manufacturing process, a prepreg manufacturing process or a resin film infusion process.

A formulation, comprising: (i) a base resin comprising at least one epoxy; (ii) a curing agent; (iii) an amount of thermoplastic material; and (iv) an amount of core-shell particles wherein the base resin, the curing agent, the thermoplastic material and the particles are combined to form the modified resin system, the modified resin having an amount of thermoplastic material of less 30% net weight, preferably less than 7% net weight, of the total weight of the modified resin system is herein disclosed.

With the base resin in a partially cured or gel-like state, the thermoplastic material phase may separate into aggregate domains from the base resin. The amount of particles and the amount of thermoplastic material may be combined in a 1 to 0.56 ratio. With the base resin in a partially cured, gel-like, cured or vitrified state the particles are substantially uniformly dispersed throughout the modified resin system. The modified resin system may have an average viscosity of less than 5 Poise at a temperature of less than 180° C., more narrowly between 80° C. and 130° C. With the base resin in a cured or vitrified condition, the thermoplastic material may separate into aggregate domains from the base resin, each aggregate domain having an island-like morphology. The morphology in a cured article may evolve (i) during the later stages of a ramp to dwell temperature or (ii) after a ramp to dwell has been completed during the cure cycle.

A manufacturing process, comprising: (i) preparing a preform; (ii) laying the preform within a mold; (iii) heating the mold to a predetermined temperature; and (iv) injecting a resin wherein the resin is a modified resin, the modified resin system comprising a combination of: (i) at least one base resin; (ii) a curing agent; (iii) an amount of particles within a predetermined range in a carrier resin; and (iv) an amount of thermoplastic material within a predetermined range wherein the amount of thermoplastic material of the modified resin is less than 30% net weight, preferably less than 7% net weight, of the total weight of the modified resin system is herein disclosed.

The predetermined temperature of the mold may be 110° C. The manufacturing process may further comprise ramping a temperature of the mold to 180° C. at a rate of less than 10° C. per minute, more narrowly, less than 5° C. per minute. The manufacturing process wherein, when the mold reaches 180° C., the temperature is held for between 90 minutes and 150 minutes. The preform may be sealed within the mold by at least a vacuum bag. An average viscosity of the modified resin system may be less than 5 Poise at a temperature range of less than 180° C., more narrowly between 80° C. and 130° C. The preform may be comprised of plurality of layers of fiber-based fabric. The fiber-based fabric may have a structure comprising one of woven fabrics, multi-warp knitted fabrics, non-crimp fabrics, unidirectional fabrics, braided socks and fabrics, narrow fabrics and tapes or fully-fashioned knit fabrics. The fiber-based fabric may be comprised of reinforcing fibers of a material such as organic polymer, inorganic polymer, carbon, glass, inorganic oxide, carbide, ceramic, metal or a combination thereof.

BRIEF DESCRIPTION OF THE DRAWINGS

FIGS. 7A and 7B are Transmission electron Microscopy images of the island like morphology and core shell particles witnessed in a cured and modified resin system with respect to damage resistance mechanisms according to an embodiment of the invention.

FIG. 8 Is an expanded SEM image detailing the growth rings in the thermoplastic domains present in the proposed invention.

DETAILED DESCRIPTION

The following detailed description is of the best currently contemplated modes of carrying out the invention. The description is not to be taken in a limiting sense, but is made merely for the purpose of illustrating the general principles of the invention.

Embodiments of the invention are directed to modified resin systems for use in resin infusion (RI) processes, variations of LRI processes and other suitable processes such as prepreg processes. In one embodiment, the modified resin system includes a novel combination of at least one base resin, an amount of particles within a predetermined range and an amount of thermoplastic material within a predetermined range wherein, when combined, the modified resin system has an average viscosity below a threshold average viscosity within a specific temperature range and a high level of toughness. The modified resin system may additionally include a curing agent and other suitable components. The modified resin system has been experimentally shown to exhibit a unique, controllable and constant morphology which is substantially or completely responsible for imparting a required toughness and damage resistance to a finished composite article without adversely impacting resin properties such as viscosity, potlife, cure temperature, glass transition temperature or tensile modulus of the modified resin system.

According to embodiments of the invention, a combination of at least one base resin, an amount of particles within a predetermined range and an amount of thermoplastic material within a predetermined range, in addition to other components, may be combined in a "one pot" formulation to generate a modified resin system which can be used in RI/LRI processes or prepreg processes. The modified resin system as formulated according to embodiments of the invention was discovered to have an unexpectedly low viscosity, low reactivity, a high level of toughness ($G_{1C}$), among other characteristics, when subjected to numerous experimental tests. It is anticipated that the modified resin may also be used in variations of liquid resin infusion processes including, but not limited to, Resin Infusion with Flexible Tooling (RIFT), Constant Pressure Infusion (CPI), Bulk Resin Infusion (BRI), Controlled Atmospheric Pressure Resin Infusion (CAPRI), Resin Transfer Molding (RTM), Seemann Composites Resin Infusion Molding Process (SCRIMP), Vacuum-assisted Resin Infusion (VARI), Resin Transfer Injection (RTI) and Vacuum-assisted Resin Transfer Molding (VARTM) as well as other processes used to manufacture composite articles.

Figure 1:
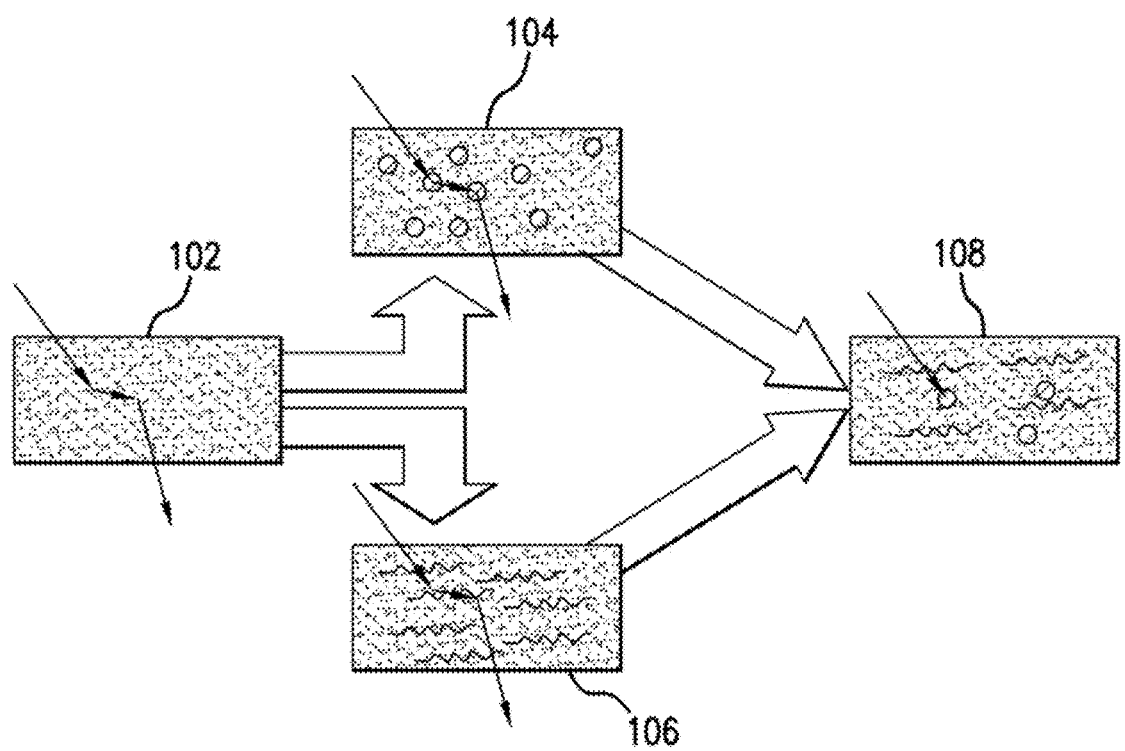
FIG. 1 is a schematic illustrating conventional toughened resin systems and the modified resin system according to an embodiment of the invention.

FIG. 1 is a schematic illustrating conventional resin systems and the modified resin system according to an embodiment of the invention. Numerical reference 102 represents an unmodified neat epoxy which may be used in composite manufacturing processes. An unmodified epoxy resin system is generally known to be unsuitable in the manufacture of high toughness composite articles without resorting to the use of a secondary, insoluble toughening article such as a hot-melt adhesive web, e.g., SPUNFAB® veil. Numerical reference 104 represents a modified epoxy system having core-shell rubber (CSR) particles therein to impart a toughening characteristic. Typically, modified epoxy systems of this type are known to exhibit high toughness values which often do not translate into equivalent composite performance. Numerical reference 106 represents another modified epoxy system having a thermoplastic therein. This modified epoxy system is known to have an average viscosity which is outside of acceptable processing windows for LRI applications.

Numerical reference 108 represents a modified resin system according to embodiments of the invention which is characterized by having a suitable average viscosity for LRI (e.g., less than 5 Poise) without sacrificing performance in the resin or composite, specifically related to toughness properties. Modified resin system 108 includes at least one base resin, an amount of particles within a predetermined range and an amount of thermoplastic material within a predetermined range in a novel combination which makes it suitable for LRI processes, prepreg processes and other like processes. In FIG. 1, the base resin is an epoxy resin or combination of epoxy resins; however, embodiments of the invention are not limited to epoxy resins.

In the context of this application, a "resin" is a synthetic polymer compound which begins in a viscous state and hardens with treatment. Resins are used as a structural matrix material in the manufacture of adhesives and composites and are often reinforced with fibers (e.g., glass, Kevlar, Boron and Carbon). In some embodiments, the base resin may be any one of epoxy, bismaleimide, benzoxazine, cyanate ester, vinyl ester, polyisocyanurates, bismalimide, cyanate ester, phenolic resin or any combination thereof in addition to other suitable resins. In some embodiments, the base resin is an epoxy resin or a combination of epoxy resins. The epoxy resin may be a tetra-, tri-, di-epoxy or combinations of tetra-, tri- and/or di-epoxies. Exemplary tri-epoxies include triglycidyl p-aminophenol (MY-0510 available from Huntsman Advanced Materials, Inc.) and triglycidyl m-aminophenol (ARALDITE® MY-0600 available from Huntsman Advanced Materials, Inc.). An exemplary tetra-epoxy is tetraglycidyl diaminodiphenyl methane (MY-721 available from Huntsman Advanced Materials, Inc.). Other suitable epoxy resins include bisphenol F epoxy (PY-306 available from Ciba Geigy).

In the context of this application, a "particle" is a polymer-based material having a core-shell or hollow morphology. Core-shell rubber (CSR) particles have the characteristic of having a core comprising of a rubbery material surrounded by an outer shell of glassy material. CSR particles are used as toughening agents when combined with polymeric matrices, e.g., epoxy resins. In some embodiments, the particles may be any commercially available chemically functionalized or chemically nonfunctionalized CSR particles having a core material of polybutadiene-styrene or polybutadiene and having a shell material of silica or polymerized monomers of acrylic acid derivatives containing the acryl group including acrylic and poly(methyl methacrylate). The CSR particles may be supplied in a carrier resin such as tetraglycidyl diaminodiphenyl methane (i.e., MY-721) and may have a diameter of between about fifty (50) nanometers (nm) and about eight hundred (800) nm, in one embodiment, about one-hundred (100) nm. Examples of commercially available CSR particles include, but are not limited to, the Paraloid series of materials (available from Rohm and Haas), MX411 (polybutadiene-styrene/acrylic) and MX416 (polybutadiene/acrylic) (both are dispersions in Huntsman MY721 epoxy resin and are available from Kaneka Corp.); however, any particle exhibiting the CSR or hollow structure as described above may be used in the modified resin systems according to embodiments of the invention.

Core-shell particles have been evidenced to toughen LRI systems via a cavitation mechanism in addition to crack pinning or "tear out" mechanisms. In a cavitation mechanism, the rubbery cores of the CSR particles yield under the stress concentrations at a crack tip, resulting in dissipation of energy from the crack front and the formation of voids in the core material.

In the context of this application, a "thermoplastic" is a polymer that is elastic and flexible above a glass transition temperature ($T_g$). In some embodiments, the thermoplastic material comprises one of phenoxy-based polymers, poly(ether sulfone) (PES) polymers, poly(ether ether sulfones), polymerized monomers of acrylic acid derivatives containing the acryl group including acrylic and poly(methyl methacrylate) (PMMA) polymers, carboxyl terminated butadiene acrylonitrile (CTBN) polymers, copolymers thereof, or combinations thereof. Representative thermoplastics include, but are not limited to, KM180 (available from Cytec Industries. Inc.), 5003P (available from Sumitomo Corp.), PKHB (InChemRes); however, any thermoplastic or other suitable material (e.g., Nanostrength X, available from Arkema, Inc.) exhibiting a thermally driven phase separation from a base resin, more particularly, exhibiting aggregate domains, or an "island-like" morphology (explained in more detail below), may be used in the modified resin systems according to embodiments of the invention.

An example of a typical mechanism for thermoplastic toughening of composite or resin matrices is crack pinning. Indications of crack pinning mechanisms include tailing behind thermoplastic domains or apparent plastic deformation around such thermoplastic zones originating from a divergent crack front around a thermoplastic rich region and subsequent convergence of the split crack fronts. Another example of a typical toughening mechanism is that of ductile tearing which can be described as a localized plastic deformation upon application of a stress to the material.

A "curing agent" is a substance or mixture of substances added to a polymer composition (e.g., resin) to promote or control the curing reaction. Addition of curing agent functions to toughen and harden a polymer material by crosslinking of polymer chains. Representative curing agents include, but are not limited to, methylenebis (3-chloro-2, 6 diethylaniline) (MCDEA), 3,3'-diaminodiphenyl sulfone (3,3'-DDS), 4,4'-diaminodiphenyl sulfone (4,4'-DDS), dicyandiamide (DICY), N-methyl-diethanolamine (MDEA) and 4,4'-methylene-bis-(2-isopropyl-6-methyl-aniline) (MMIPA).

According to embodiments of the invention, the modified resin system may include a thermoplastic which is 7% or less net weight of the modified resin system combined with an amount of CSR particles in a 1 to 0.56 ratio of thermoplastic to CSR particles. In one embodiment, the base resin may be a combination of di-, tetra- and tri-epoxies such as PY-306, MY-0500 and/or MY-0600). In one embodiment, the thermoplastic material may be 5003P and the CSR particles may be MX411 (in MY-721) or MX416 (in MY-721) one-hundred (100) nm particles. A curing agent, such as MCDEA, may be added to the "one pot" resin system to make the resin system curable when heat and/or pressure is/are applied thereto.

The formulation of the present invention comprises at least one base resin; an amount of particles within a predetermined range in a carrier resin; and an amount of thermoplastic material within a predetermined range wherein the base resin, the particles and the thermoplastic material are combined to form a modified resin system, the modified resin having an average viscosity below a threshold average viscosity within a predetermined temperature range. The threshold average viscosity of the formulation is less than 5 Poise at a temperature of less than 180° C. and preferably at a temperature of between 80° C. and 130° C.

When the formulation is in a cured condition, at least the thermoplastic material is phase separated from the base resin and preferably phase separates into aggregate domains from the base resin, each aggregate domain having an island-like morphology. The cure morphology evolves (i) during the later stages of a ramp to dwell temperature or (ii) after a ramp to dwell has been completed during the cure cycle.

The amount of thermoplastic material in the formulation is below approximately 30% net weight of the modified resin system and preferably below approximately 7% net weight of the modified resin system.

The formulation may include an amount of particles and the amount of thermoplastic material combined in a 1 to 0.56 ratio.

When the formulation is in a cured condition, the thermoplastic material is phase separated from the base resin and preferably, the thermoplastic material phase separates into aggregate domains from the base resin, each aggregate domain having an island-like morphology.

Further embodiments of the present invention include a manufacturing process, comprising preparing a preform, laying the preform within a mold, heating the mold to a predetermined temperature and injecting a resin wherein the resin is a modified resin, the modified resin system comprising a combination of: (i) at least one base resin; (ii) a curing agent; (iii) an amount of particles within a predetermined range in a carrier resin; and (iv) an amount of thermoplastic material within a predetermined range wherein the amount of thermoplastic material of the modified resin is less than 30% net weight of the total weight of the modified resin system.

The above manufacturing process may further modified wherein the predetermined temperature of the mold is between 90° C. and 120° C. or more preferably the predetermined temperature of the mold is 110° C.

The manufacturing process may be practiced by ramping a temperature of the mold to 180° C. at a rate of up to 5° C. per minute or more preferably at a rate of 2° C. per minute.

Furthermore, when the mold reaches 180° C., the temperature may be held about 120 minutes.

The manufacturing process may be practiced wherein the preform is a plurality of layers of fiber-based fabric. The fiber-based fabric may have a structure comprising one of woven fabrics, multi-warp knitted fabrics, non-crimp fabrics, unidirectional fabrics, braided socks and fabrics, narrow fabrics and tapes or fully-fashioned knit fabrics. The fiber-based fabric may utilize reinforcing fibers of a material selected from the group consisting of organic polymer, inorganic polymer, carbon, glass, inorganic oxide, carbide, ceramic, metal or a combination thereof.

Furthermore, the manufacturing process is preferably practiced where the preform is sealed within the mold by at least a vacuum bag.

Representative formulations according to embodiments of the invention were prepared according to the following general Example:

Example 1

A base resin having di-, tri- and tetra-epoxies, a quantity of amine curing agent and quantities of 5003P thermoplastic and CSR particles (i.e. MX411) were combined. The combination (100 grams) was transferred into steel molds which were then placed in a fan oven preheated to 100° C. (ramp to 180° C. at 1° C. per minute, dwell for 2 hrs ramp to 25° C. at 2° C. per minute). Samples (prepared from the cured modified resin plaque) were prepared according to the relevant ASTM standard for the desired test.

Example A

Effect of Thermoplastic and CSR Concentrations on Resin Toughness.

Experiments were conducted to quantify the effect of thermoplastic (i.e., 5003P) in the absence of core-shell particles (i.e. MX411) (and vice versa, i.e., core-shell particles) as toughening agents, thereby providing a baseline for the toughening mechanism in the formulation according to embodiments of the invention. The viscosity (TO) in the base resin system (containing no CSR particles) was observed to increase as the percentage loading of thermoplastic was increased, but to be independent of CSR concentration. The toughness ($G_{1C}$) of the systems was found to increase with both increasing thermoplastic and CSR concentration. It can be appreciated by one of ordinary skill in the art that the use of CSR particles to achieve a high resin $G_{1C}$ does not often translate into a high level of composite toughness performance. Due to the combination of thermoplastic and CSR according to embodiments of the invention, the toughness ($G_{1C}$) versus viscosity behavior of the formulation is closer to that of a CSR toughened material than that of a thermoplastic toughened material (see FIG. 2).

Example B

Comparison of the Variation of CSR Particles to Thermoplastic Loading.

Figure 2:
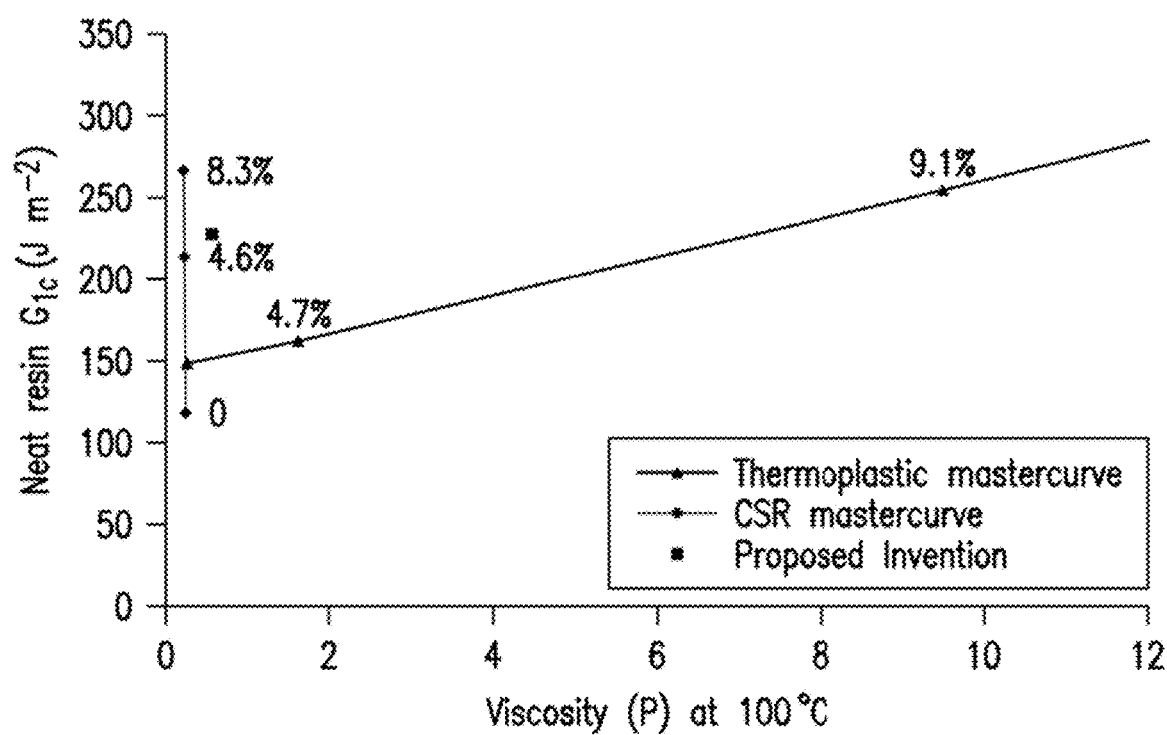
FIG. 2 is a chart showing the relationship between viscosity and toughness for a thermoplastic material in a base resin, core-shell particles a base resin, and a combination of thermoplastic material and core-shell particles in a base resin according to an embodiment of the invention.

Experiments were conducted to quantify the effect of CSR particle (i.e., MX411) and thermoplastic (i.e., 5003P) loading in the base resin (see FIG. 2). The viscosity (TO) of the material was found to increase with thermoplastic and CSR content. The systems studied displayed viscosity minima onsets which were found to vary with increasing percentage masses of thermoplastic and CSR. The toughness ($G_{1C}$) behavior of the cured materials was found to follow an approximately linear relationship with the viscosity of the system. Increasing the percentage of thermoplastic and CSR (maintaining the 1 to 0.56 ratio) was shown to give an unexpectedly high increase in the fracture toughness of the neat resin when compared to the equivalent thermoplastic loading. The morphology in the cured materials was shown to follow a similar fashion to that expected from samples containing equivalent loadings of analogous thermoplastic (see FIG. 3A, 3B).

Example C

Comparison of the Variation of CSR Particles to Thermoplastic Ratio.

Figure 3A:
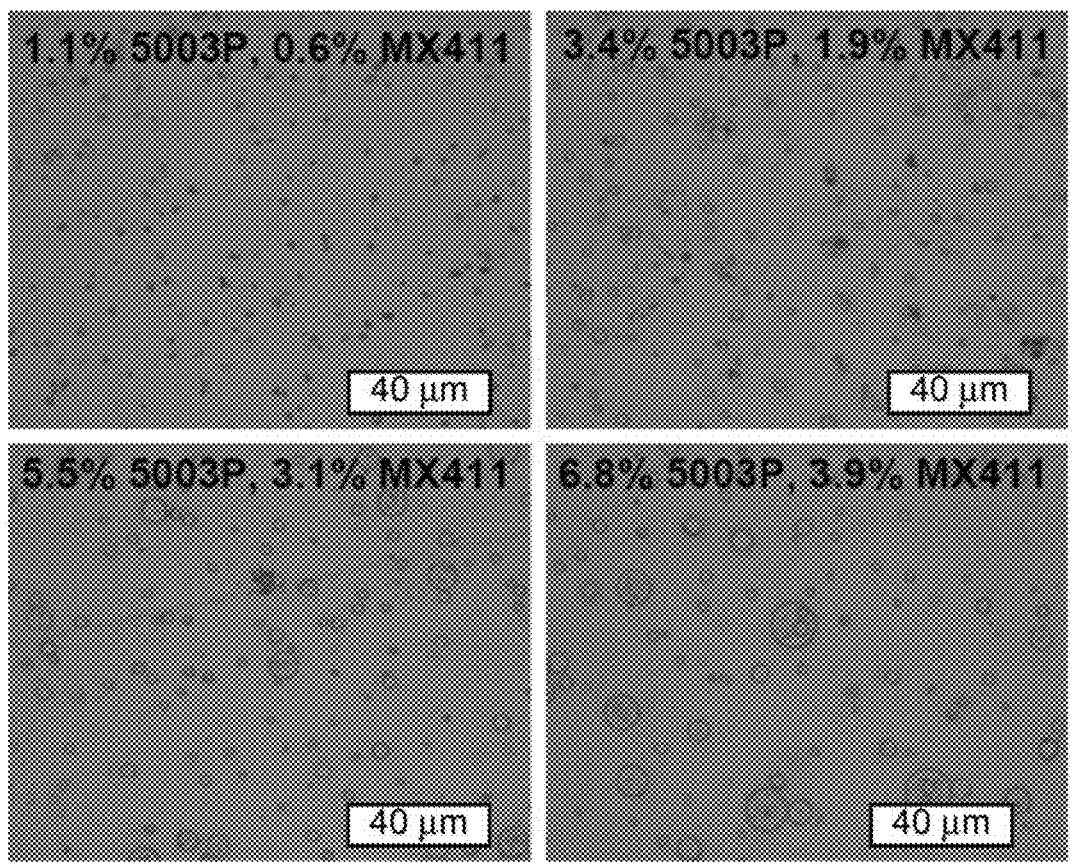
FIG. 3A is an optical micrograph of thermally-evolved thermoplastic domains and core-shell rubber particle regions at increasing concentration, but at a constant ratio of core-shell particles:thermoplastic toughener in a modified resin system according to an embodiment of the invention.
Figure 3B:
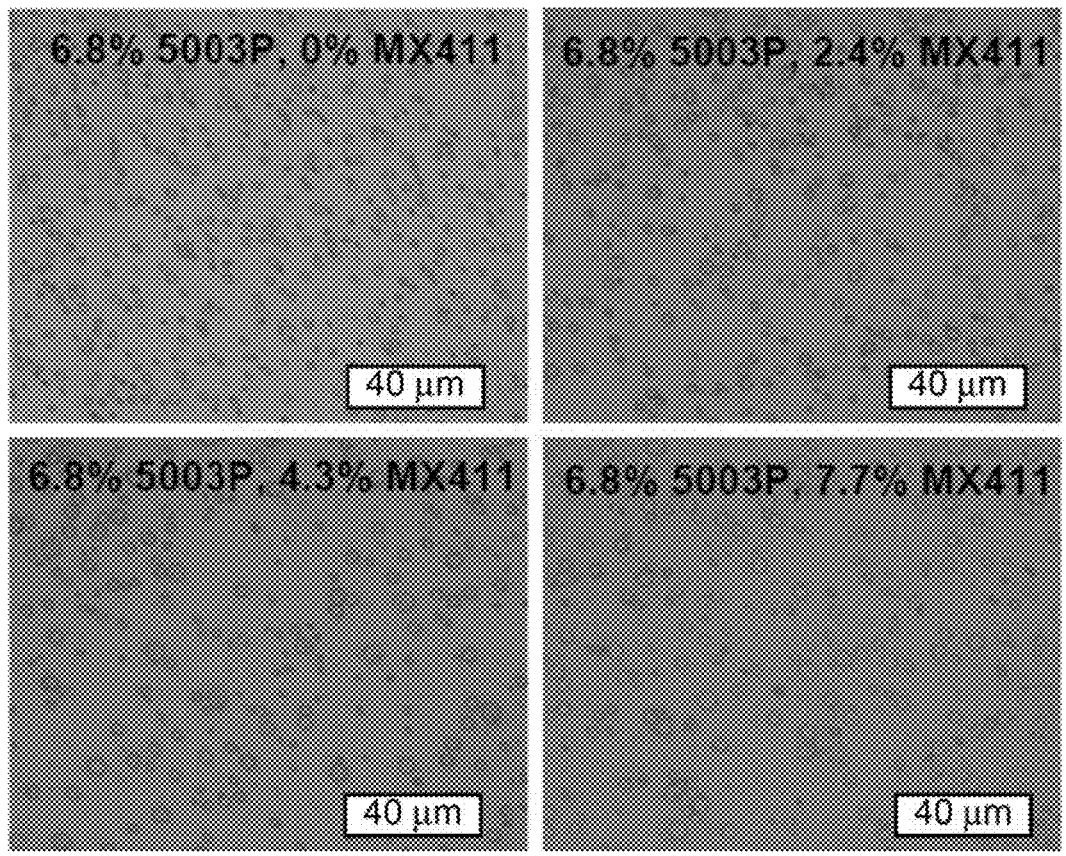
FIG. 3B is an optical microscopy evaluation of the thermally evolved thermoplastic domains and CSR particle regions in the proposed invention demonstrating the influence of CSR concentration on the dimensions of the witnessed morphology.

Experiments were conducted to quantify the effect of varying the ratio of CSR particles to thermoplastic (see FIG. 3B). The toughness ($G_{1C}$) behavior of the neat resins was shown to follow a simple linear relationship as established for other formulations. Additionally, the presence of CSR and thermoplastic domains in the bulk resin phase was shown to result in high $G_{1C}$ values for the neat resin. The size of the proposed thermoplastic domains in the cured material was found to increase with CSR content.

Example D

Comparison of the Variation of CSR Particles

TABLE D-1

| CSR particle | Viscosity at 100° C. (P) | Viscosity at 130° C. (P) | $G_{1C}$ (J m$^2$) | $T_g$ (° C.) | ε (GPa) |
|---|---|---|---|---|---|
| CSR A | 3.1 | 1.1 | 233 | 166 | 3.57 |
| CSR B | 4.2 | 1.63 | 233 | 165 | 3.63 |

Experiments were conducted to compare different CSR particles having different core chemistries. In this example, "A" is poly(styrene-butadiene-styrene) or SBS core and "B" is polybutadiene core. There was a negligible viscosity (TO) increase with systems incorporating polybutadiene chemistry (CSR A) relative to systems incorporating SBS core chemistry (CSR B).

In order to develop a formulation suitable for LRI, prepreg and like applications while also resulting in appropriately toughened laminate structures, the modified resin systems were targeted to remain within a threshold limit of an average viscosity within a temperature range while maintaining a high level of toughness ($G_{1C}$). It was discovered that formulations according to embodiments of the invention complied with a threshold average viscosity of less than five (5) P with a net weight of thermoplastic material of less than 30%, more narrowly less than 7%, combined with an amount of CSR particles in a 1 to 0.56 ratio of thermoplastic to CSR particles, which resultant combined characteristics rendered the modified resin system suitable for LRI applications. The viscosity of less than (5) P was discovered to be achievable at a temperature of less than 180° C., more narrowly between 80° C. and 130° C.

According to some embodiments, the thermoplastic material is between about 0.1% and 7% net weight of the modified resin system and the amount CSR particles is between about 0.1% and 10% net weight of the modified resin system while maintaining a 1 to 0.56 ratio of thermoplastic to CSR particles. In one embodiment, the thermoplastic material is about 3.4% net weight of the modified resin system and the amount CSR particles is about 1.9% net weight of the modified resin system while maintaining a 1 to 0.56 ratio of thermoplastic to CSR particles. It was discovered that the main contribution to achieving the threshold viscosity was, among other factors, attributable to the thermoplastic.

Representative formulations according to embodiments of the invention are illustrated in the following Table 1:

TABLE 1

| | Base Resin | CSR particles | Thermoplastic | Curing agent |
|---|---|---|---|---|
| Formulation 1 | 7.79% PY-306; 15.58% MY-0510; 15.58% MY-0600 | 3.89% MX411 in 3.89% MY-721 | 6.85% 5003P | 46.42% MCDEA |
| Formulation 2 | 8.09% PY-306; 16.19% MY-0510; 16.19% MY-0600 | 2.02% MX411 in 6.04% MY-721 | 3.22% 5003P | 48.25% MCDEA |

TABLE 1-continued

| | Base Resin | CSR particles | Thermo-plastic | Curing agent |
|---|---|---|---|---|
| Formulation 3 | 8.09% PY-306; 16.19% MY-0510; 16.19% MY-0600 | 2.02% MX416 in 6.04% MY-721 | 3.22% 5003P | 48.25% MCDEA |

Modified Resin Properties

Microcrack Resistance.

Microcrack resistance is the ability of a material to resist formation of small, numerous cracks upon induced stress and strain in the material which instigates localized damage events that eventually weaken and compromise the composite article. Microcrack resistance is typically evaluated using multiple, simulated strain cycles. Samples are withdrawn for microscopic analysis during the cycle phase and cracks are readily identifiable after penetrative staining. During experiments, cured modified resin samples showed no microcracks after 400 thermal cycles (−53° C. to 90° C.) in one experiment and no microcracks after 2000 thermal cycles in another experiment.

Example 2

Figure 4:
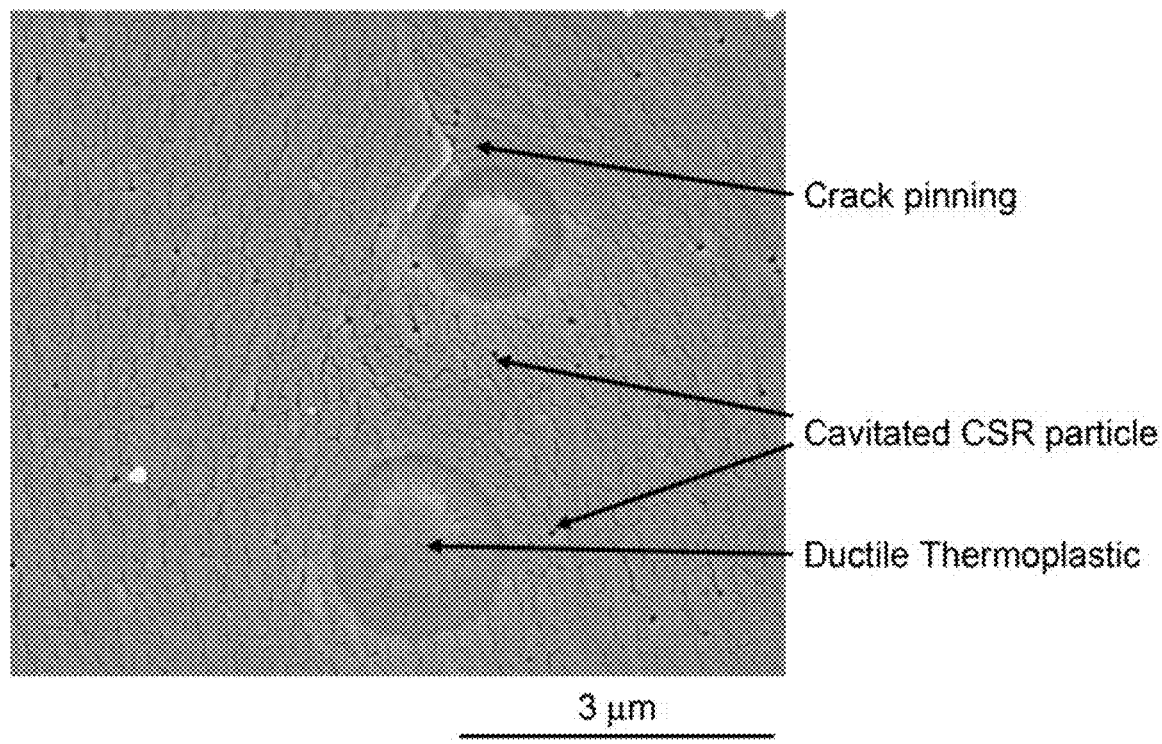
FIG. 4 is a scanning electron microscopy (SEM) image of the island like morphology and core shell particles witnessed in a cured and modified resin system with respect to damage resistance mechanisms according to an embodiment of the invention.

Modified resin systems and unmodified or partially modified resin systems were prepared and compared to study crack pinning, ductile tearing and cavitation behavior of the systems expressed in fracture toughness ($K_{1C}$) values. The following systems were prepared: (i) a modified resin system having thermoplastic and CSR particles (Formulation 4); (ii) a partially modified resin system having thermoplastic material (Formulation 5); (iii) a partially modified resin system having CSR particles (Formulation 6); and (iv) an unmodified resin system (Formulation 7). Examination of the fracture surface of Formulation 4 illustrated multiple fracture toughness mechanisms at work. The thermoplastic domains (i.e., 5003P) displayed ductile tearing and crack pinning behaviors while the CSR particle domains (i.e., MX411) exhibited features indicative of a cavitation mechanism (see FIG. 4). On the other hand, examination of the fracture surface of the other Formulations 5, 6, 7 exhibited none or only partial similar damage resistance as that found with respect to Formulation 4. Additionally the combination of a low concentration of thermoplastic appeared to facilitate a more homogenous dispersion of CSR particles than in Formulation 6. The following Table 2 summarizes these findings:

TABLE 2

| | Toughening agent | Evidenced toughening mechanism | CSR dispersion |
|---|---|---|---|
| Formulation 4 | Thermoplastic (5003P); CSR particles (MX411) | Ductile tear; crack pinning; cavitation | Good |
| Formulation 5 | Thermoplastic (5003P) | Ductile tear; crack pinning | N/A |
| Formulation 6 | CSR particles (MX411) | Tear out | Agglomerated |
| Formulation 7 | N/A | N/A | N/A |

Figure 5:
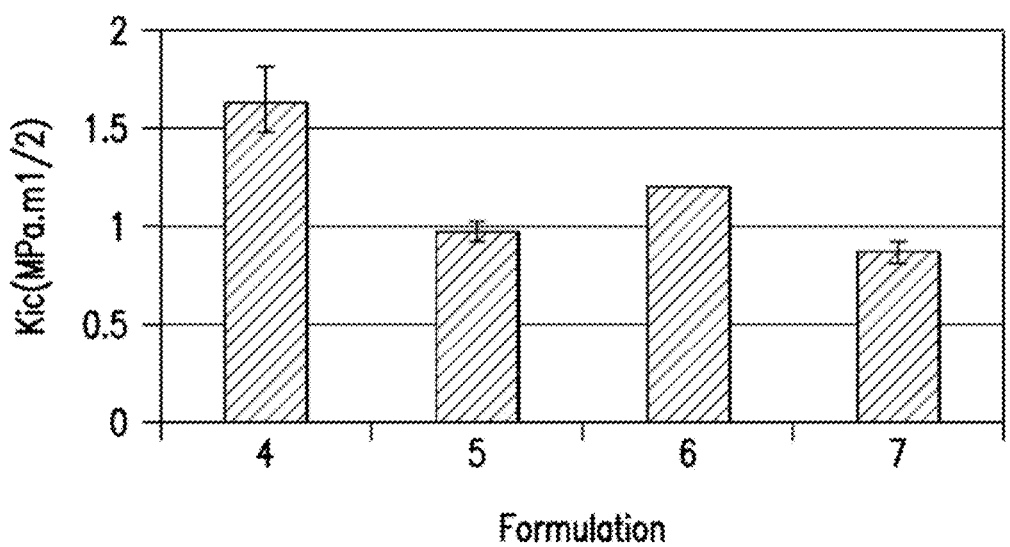
FIG. 5 is a graph comparing the fracture toughness of a modified resin system according to embodiments of the invention to the fracture toughness of other resin systems.
Figure 6:
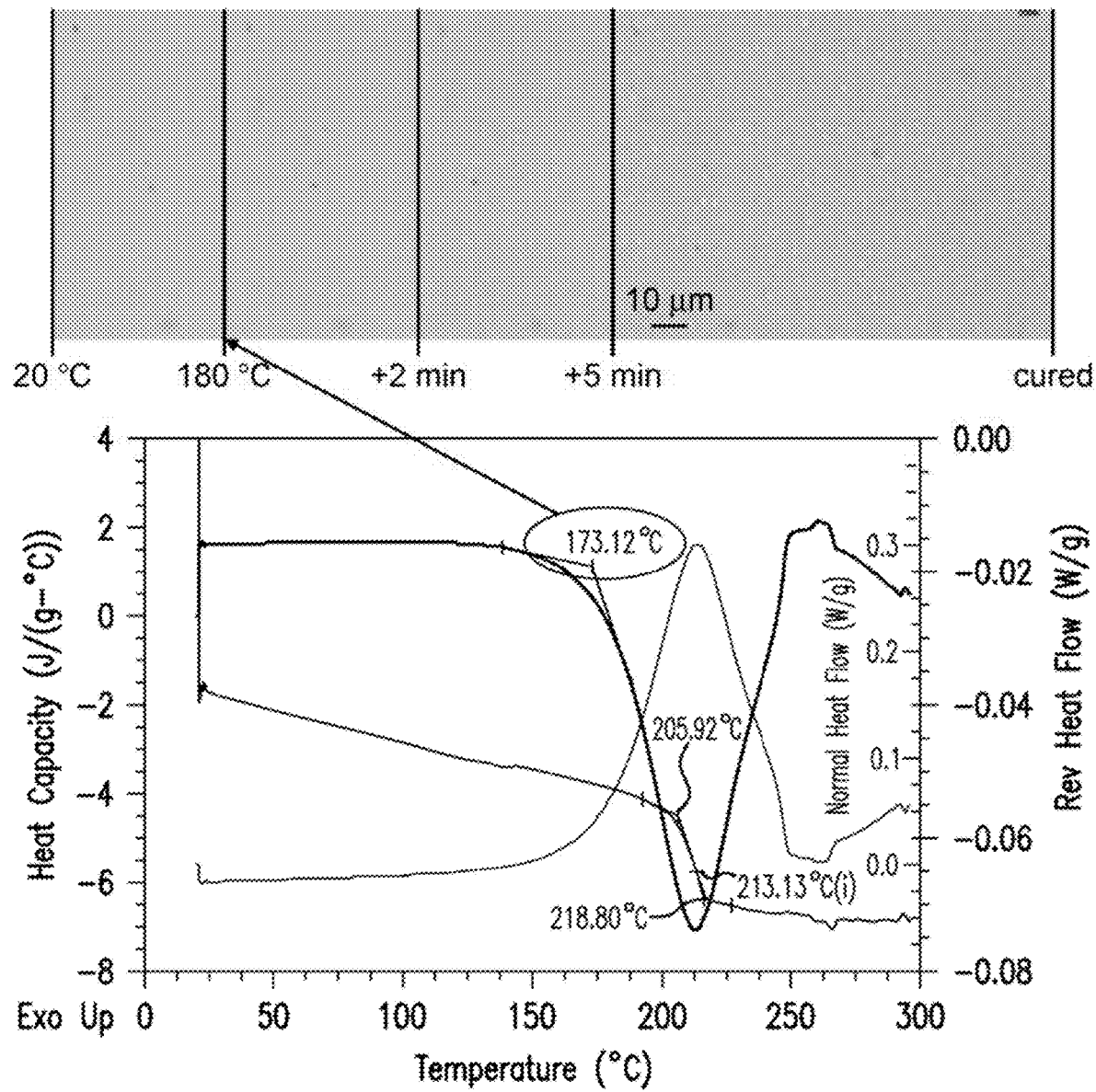
FIG. 6 Describes the evolution of the morphology as represented by an embodiment of the current invention as a function of temperature or vitrification onset in the base resin comprising the proposed invention.

A numerical evaluation of the fracture toughness ($K_{1C}$) behavior demonstrated that Formulations 5, 6, 7 were relatively indistinguishable from each other within the experimental parameters as described above as compared to Formulation 4 (see FIG. 5). The $K_{1C}$ study highlights the symbiotic relationship of thermoplastic material and CSR particle toughening mechanisms within modified resin systems according to embodiments of the invention. This was supported by an SEM investigation which indicated that in the case of the proposed invention, the degree of ductile failure was observed to be lower than that witnessed in formulation 5. Additionally the degree of debonding between the thermoplastic domains in the proposed invention was found to be significantly less than that witnessed in Formulation 5 (ductile failure and debonding of thermoplastic regions, FIGS. 5 and 6) and it was also shown that the CSR domains Formulation 4 exhibited a cavitation-driven toughening mechanism as opposed to the tear out mechanism witnessed in Formulation 6 (FIG. 6).

Morphology Study

Evolution of Morphology as a Function of Temperature.

An investigation was conducted to elucidate the onset point of morphology formation in the modified resin system, as embodied by the proposed invention and prepared according to Example 1, during a cure cycle. During this investigation, the morphology of the modified resin system was determined to generally consist of a phase separation, more particularly, an "island-like" morphology, of the thermoplastic and/or CSR particles from the base resin. The "island-like" morphology is generally a result of a thermally driven phase separation of the thermoplastic from the base resin into discrete domains of thermoplastic-rich material identified by a clearly defined border with the cured or partially cured base resin when the modified resin system is in a cured or partially cured condition. This morphology was shown to evolve over a sixty (60) minute time interval during ramp-up temperature followed by a constant temperature during a cure cycle. At zero (0) minutes, between 80° C. and 160° C., the modified resin components (thermoplastic, CSR particles and epoxy resin(s)) were shown to be in a substantially uniform, dispersed phase. Between zero (0) minutes and ten (10) minutes, between 170° C. and 180° C., thermally nucleated "seeds" began to evolve followed by development of these seeds. Between ten (10) minutes and sixty (60) minutes, with the temperature held constant at 180° C., thermoplastic domains began to evolve. At about sixty (60) minutes, the morphology of the thermoplastic domains was seen to be substantially or completely evolved (see FIG. 6). This unique processing factor, i.e., the controlled and constant morphology evolution developed during a time period and at a critical temperature (in this case, at about 180° C.), advantageously avoids flow and filtration issues which would otherwise arise from having additive particles of the same size as the CSR particles in conventional formulations. Through chemical modification of the curing agent and the associated control of the resin vitrification point it is expected that the morphology discovered by applicants will develop at temperatures of less than 180° C.

Effect of Altering Net Percentage of Thermoplastic and CSR Particles.

The morphology of the cured modified resin system (including the development of thermoplastic domains) was determined to be generally dependent upon the relative concentrations of CSR particles and thermoplastic and, therefore, directly controllable.

Generalized Morphology.

Figure 9:
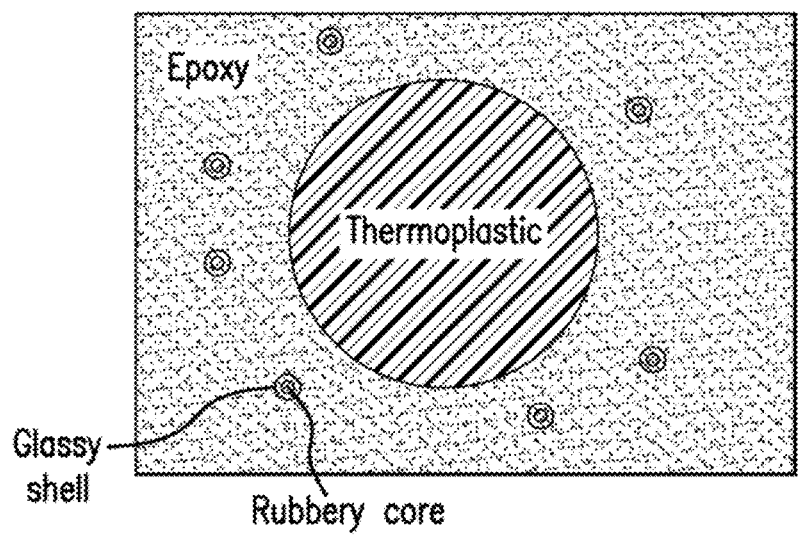
FIG. 9 illustrates a schematic of the generalized morphology of a modified resin system according to embodiments of the invention FIG. 10 Illustrates a representative LRI system having a fabric perform thereon.

An investigation was conducted to further elucidate the morphology of the modified resin system. The investigation was performed by taking images of the cured resin using a scanned electron microscope (SEM) and a transmission electron microscopy (TEM). The results of the TEM and SEM investigations suggest that the thermoplastic domains form via a phase separation of thermoplastic from the base resin during the cure of the resin while the CSR particles remain located within the base resin and are not drawn into the thermoplastic domains (see FIGS. 3A, 3B, 4). The TEM evidence is supported by SEM evidence indicating the presence of growth rings within the thermoplastic morphology (see FIGS. 7A, 8, 9) and also a combined optical microscopy/differential scanning calorimetry (DSC) study demonstrating the onset of morphology growth at the point where the resin begins to vitrify (see FIG. 6).

FIG. 3A illustrates a schematic of the generalized morphology of the modified resin system according to embodiments of the invention as discovered by the inventors. As shown in FIGS. 3A-3B (see also FIGS. 4, 6-9) addition of thermoplastic within a predetermined range (as well as CSR particles within a predetermined range) to a base resin (having one or more resins) resulted in a thermally-induced phase separation of the thermoplastic material from the base resin during the cure cycle of the modified resin system. Furthermore, the CSR particles were observed to partially, substantially or completely remain within the base resin and were not therefore experimentally determined to be incorporated into the thermoplastic material domains.

In addition to being advantageous with respect to processing (see Evolution of morphology above), the morphology of the modified resin system discovered by the inventors is believed to contribute to the combination of high Compressive After Impact Strength (CSAI), $K_{1C}$, toughness ($G_{1C}$), and microcrack resistance required for composite articles exposed to damage caused by environmental conditions and/or events while simultaneously allowing for a wide processing window during the fabrication process. It is anticipated that any thermoplastic exhibiting phase separation morphology, more particularly, an "island-like" morphology, combined with a suitable nanoscale particle (i.e., CSR or hollow particle) would be appropriate for formulating modified resin systems according to embodiments of the invention.

Processing Methods Using LRI

Figure 10:
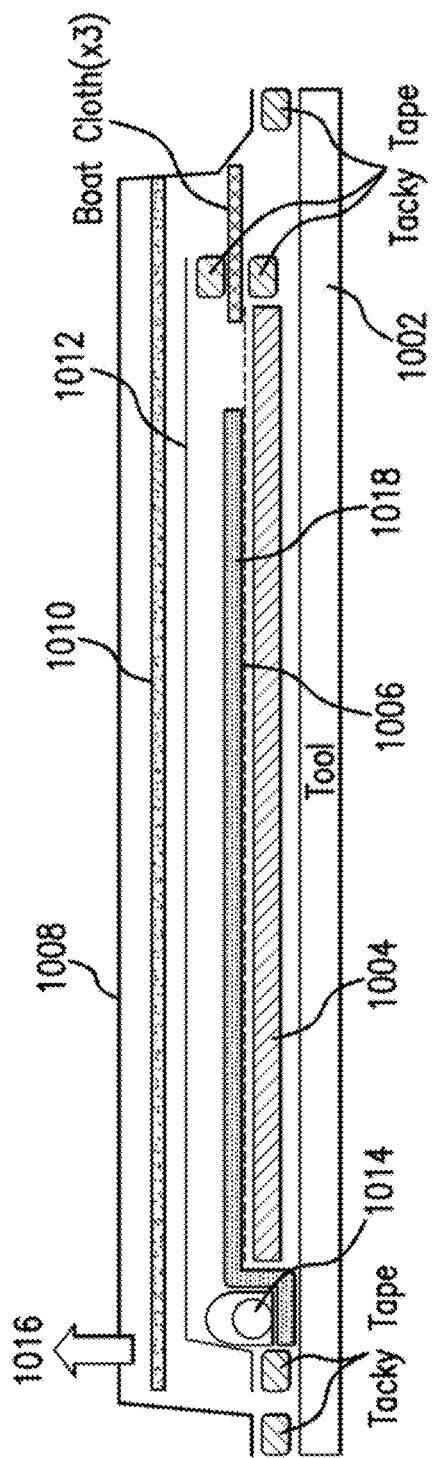

FIG. 10 illustrates a representative LRI approach (e.g., Resin Infusion in Flexible Tooling (RIFT)) having a fabric preform thereon. As shown, the system includes a single-sided tool (i.e., mold) 1002 with a fiber preform 1004 laid thereon. A peel-ply layer 1006 may be applied to a surface of preform 1004. A vacuum bag 1008 having a breather 1010 therein seals preform 1004 creating a "cavity", or area in which preform 1004 resides. Before preform 1004 is laid on tool 1002, a release agent or gel coat 1012 may be applied to a surface of tool 1002 and/or to a surface of vacuum bag 1008. At one end, the "cavity" is connected to a resin inlet 1014 via a resin transfer line (not shown). At another end, or at the same end, the "cavity" is connected to a vacuum system (not shown) via a vacuum evacuation line 1016. Once preform 1004 is positioned within tool 1002 and vacuum is applied, a liquid resin 1018 may be infused into the "cavity" at ambient pressure, a predetermined pressure or a gradient pressure. Liquid resin 1018 may be infused at ambient temperature, a predetermined temperature or a temperature gradient.

According to embodiments of the invention, modified resin systems (as described previously) may be applied to preforms constructed from one or more layers of engineered textiles to manufacture composite articles using LRI processing techniques and tools (such as that represented in FIG. 10). The engineered textiles may include, but are not limited to, woven fabrics, multi-warp knitted fabrics, non-crimp fabrics, unidirectional fabrics, braided socks and fabrics, narrow fabrics and tapes and fully-fashioned knit fabrics. These fabric materials are typically formed of fiber glass, carbon fiber, aramid fibers, polyethylene fibers or mixtures thereof. When the preform is subjected to LRI, LRI-derived laminates are produced.

Representative laminate test samples having the modified resin system according to embodiments of the invention infused therein were prepared according to the following general example.

Example 3

Initial lay-ups of non-crimped fiber (NCF) fabric (8 ply layup) were prepared for RIFT (see FIG. 10) to produce laminate test samples. In this embodiment, the fabric was of a carbon material. Laminate test samples were also prepared using a closed mold RTM press set at 25 cm³/minute flow rate and an eight (8) millimeter (mm) inlet. In both cases, the resin pot was held constant at 100° C. and the tool was held constant at 110° C. for infiltration of the resin prior to commencing a 2° C. per minute ramp towards 180° C., dwelling for two (2) hours before ramping down at 2° C. per minute to room temperature. Generally, the tool may be heated to a temperature of between 130° C. and 180° C. at a rate of less than 10° C. per minute.

Various tests were performed on the laminate samples in order to determine compliance with threshold mechanical performance parameters. Key mechanical properties evaluated included storage modulus-derived glass transition temperature, elastic modulus, Compressive Strength After Impact (CSAI) and open hole compression (OHC) strength (wet and dry).

Laminate Mechanical Properties

Dynamic Mechanical Thermal Analysis (DMTA) was performed to determine the glass transition temperature ($T_g$) of laminate test samples in accordance with known methods. Glass transition temperature is indicative of a laminate article to carry mechanical load. Suitable ranges are between 130° C. and 210° C. for $T_g$ (dry) and between 110° C. and 170° C. for $T_g$ (wet). Modified resin systems according to embodiments of the invention were found to have a $T_g$ (dry) between 140° C. and 190° C. and between 140° C. and 160° C. (wet).

In-plane shear modulus was measured for laminate test samples according to known methods. In-plane shear modulus was determined to be between 3.5 GPa and 4.5 GPa (dry/RT) and between 3.0 GPa and 4.0 GPa (hot/wet).

Damage Resistance/Tolerance FRP Materials.

Damage resistance is the ability of the composite article to resist damage after a force event which may cause delamination and weakening of the composite article and is a critical parameter for in-service behavior in high performance applications. Damage resistance can be measured through dent depth analysis or C-scan damage area analysis of impacted composite samples. Damage tolerance can be measured by a Compressive Strength After Impact (CSAI) test.

Figure 11:
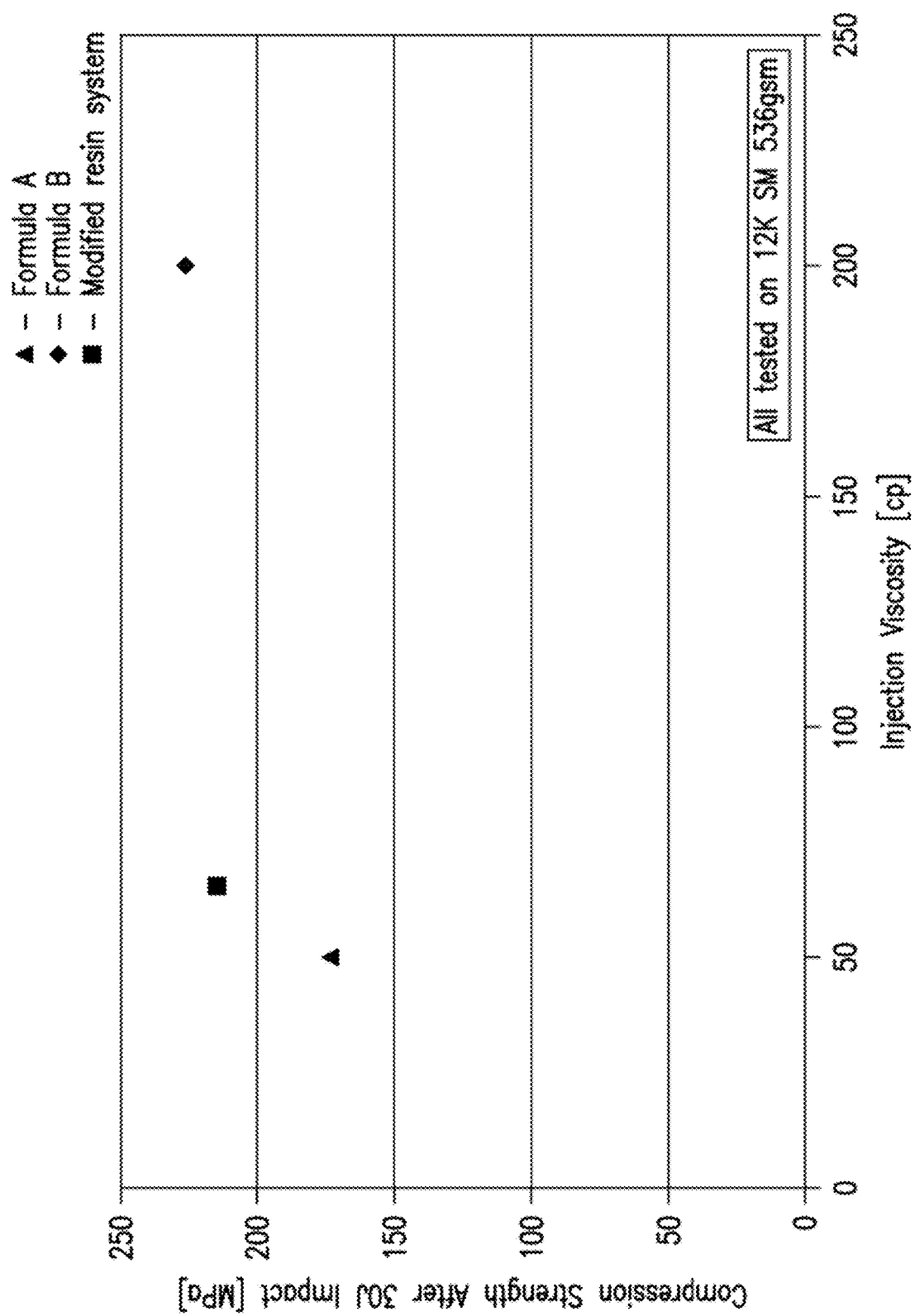
FIG. 11 is a chart comparing CSAI values of the modified resin system according to embodiments of the invention to the CSAI values for other resin systems.

Laminate test samples prepared using modified resin systems according to embodiments of the invention exhibited reduced dent depths when compared to prior art laminates. In one experiment, laminate test samples were found to have an average dent depth of between 0.6 mm and 0.8 mm following an impact event. These values represent about a 10% decrease in dent depth when compared to prior art laminates. In another experiment, laminate test samples were found to have CSAI values between about 220 and 270 Mega-Pascals (MPa) in a plain weave textile (see FIG. 11) and between about 200 and 225 MPa in a non-crimp fiber textile which indicate a high tolerance to damage after an impact event. OHC values were experimentally determined to be between 280 MPa to 320 MPa (dry) and between 220 MPa and 260 MPa (hot/wet).

The unexpected stable and low average viscosity (i.e., less than 5 P) of modified resin systems with a suitable toughness according to embodiments of the invention combined with the high microcrack resistance exhibited by resultant LRI-derived laminate articles renders it suitable for the manufacture of complex structures in a range of different industries including the aerospace, transport, electronics, building and leisure industries. Specific to the aerospace industry, the modified resin systems may be used to construct components including, but not limited to, frame and stringer-type components for twin aisle derivatives and single aisle replacement programs, fuselage shell components, integrated flight control components for replacement programs, wing box structures and rotorblade systems for rotorcraft. Additionally, the modified resin systems may be used in the manufacture of composite for complex textile systems.

While certain exemplary embodiments have been described and shown in the accompanying drawings, it is to be understood that such embodiments are merely illustrative of and not restrictive on the broad invention, and that this invention is not to be limited to the specific constructions and arrangements shown and described, since various other modifications may occur to those ordinarily skilled in the art.

What is claimed is to:

1. A manufacturing process, comprising:
   a. preparing a preform;
   b. laying the preform within a mold;
   c. heating the mold to an initial temperature;
   d. injecting a liquid resin into the mold so as to infuse the preform with the liquid resin, wherein the liquid resin consists essentially of:
      (i) a combination of epoxy resins;
      (ii) an aniline-based amine as a curing agent;
      (iii) core-shell rubber particles having a diameter between about 50 nm and about 800 nm; and
      (iv) a thermoplastic material selected from: poly(ether sulfone), poly(ether ether sulfones), and copolymer thereof,
   wherein the thermoplastic material is present in an amount of less than 7% net weight of the total weight of the liquid resin, and the liquid resin at (d) has a threshold viscosity of less than 5 Poise at a temperature between 80° C. and 130° C.; and
   e. curing the resin-infused preform,
   wherein, after curing, the thermoplastic material is phase separated into aggregate domains from the epoxy resin, each domain having an island-like morphology.

2. The manufacturing process of claim 1 wherein the initial temperature of the mold is less than 180° C.

3. The manufacturing process of claim 2, further comprising ramping the temperature of the mold from an initial temperature to a dwell temperature of 180° C. at a rate of up to 10° C. per minute, and when the mold reaches 180° C., the temperature is held for between 30 minutes and 150 minutes.

4. The manufacturing process of claim 1, wherein each of the core-shell rubber particles comprises a core of a rubbery material surrounded by an outer shell of glassy material.

5. The manufacturing process of claim 1, wherein each core-shell rubber particle has a core material of polybutadiene-styrene or polybutadiene and a shell material of an acrylic polymer.

6. The manufacturing process of claim 1, wherein the aniline-based amine curing agent is selected from: methylene bis(3-chloro-2,6-diethylaniline) (MCDEA), N-methyldiethanolamine (MDEA), and 4,4'-methylene-bis-(2-isopropyl-6-methyl-aniline) (MMIPA).

7. The manufacturing process of claim 6, wherein the curing agent is methylene bis(3-chloro-2,6-diethylaniline) (MCDEA).

8. The manufacturing process of claim 1, wherein the thermoplastic material is poly(ether sulfone).

9. The manufacturing process of claim 1, wherein the preform comprises a plurality of layers of fiber-based fabric.

10. The manufacturing process of claim 1, wherein the combination of epoxy resins in the liquid resin consists of triglycidyl p-aminophenol, triglycidyl m-aminophenol, tetraglycidyl diaminodiphenyl methane, and bisphenol F epoxy.

* * * * *